(12) United States Patent
Cheng

(10) Patent No.: US 6,506,617 B1
(45) Date of Patent: Jan. 14, 2003

(54) IN-PLANE SWITCHING LIQUID CRYSTAL DISPLAY ARRAY

(75) Inventor: Jia-Shyong Cheng, Hsinchu Hsien (TW)

(73) Assignee: Hannstar Display Corporation, Taipei (TW)

( * ) Notice: Subject to any disclaimer, the term of this patent is extended or adjusted under 35 U.S.C. 154(b) by 0 days.

(21) Appl. No.: 10/109,795

(22) Filed: Mar. 27, 2002

(30) Foreign Application Priority Data

Nov. 6, 2001 (TW) ......................................... 090127480

(51) Int. Cl.[7] ............................................. H01L 21/00
(52) U.S. Cl. ............................. 438/22; 438/30; 438/34; 438/155
(58) Field of Search ............................. 438/22, 30, 34, 438/155, 158, 149; 349/122, 149, 141

(56) References Cited

U.S. PATENT DOCUMENTS

| | | | |
|---|---|---|---|
| 6,284,558 B1 | * | 9/2001 | Sakamoto .................... 438/29 |
| 6,362,032 B1 | * | 3/2002 | Kim et al. ................... 438/158 |
| 2002/0001867 A1 | * | 1/2002 | Sung et al. .................... 438/30 |
| 2002/0085156 A1 | * | 7/2002 | Lee ............................. 349/141 |

* cited by examiner

Primary Examiner—Tuan H. Nguyen
(74) Attorney, Agent, or Firm—J. C. Patents

(57) ABSTRACT

A TFT array substrate and a process for manufacturing the same are provided. A plurality of TFTs in array are formed on a substrate. A gate insulating layer and a protection layer are sequentially formed to cover a pixel region of the substrate. A plurality of openings each of which has an undercut profile are formed in the gate insulating layer and the protection layer. Then, a transparent conductive layer is formed over the substrate. One of the two parts separated is located in a bottom of the opening and the other is on the protection layer, such that two parts of the transparent conductive layer disconnect and no junction there between occurs. The part of the transparent conductive layer in the bottom of the opening is referred to as a transparent pixel electrode. The part of the transparent conductive layer on the protection layer is connected to a common metal line to form a transparent common electrode. The transparent pixel electrode disconnects to but overlaps the protection layer.

13 Claims, 9 Drawing Sheets

IN-PLANE SWITCHING LIQUID CRYSTAL DISPLAY ARRAY

CROSS-REFERENCE TO RELATED APPLICATION

This application claims the priority benefit of Taiwan application serial no. 90127480, filed Nov. 6, 2001.

BACKGROUND OF THE INVENTION

1. Field of the invention

The present invention relates to a thin film transistor (TFT) array substrate and a process for manufacturing the same. More specifically, the present invention relates to a TFT array substrate for a self-aligned in-plane switching (IPS) liquid crystal display.

2. Description of the related art

The cathode ray tube (CRT), having superior display quality and economic effect, has been widely used as a display device. However, there are some issues with respect to the CRT device such as space utility and power consumption. As the demand for a display device having light-weight and compactness increases, a thin film transistor liquid crystal display (TFT-LCD) device to meet the current requirements has been increasingly used. However, the LDC device usually has a narrow range of viewing angle and a high price. Multi-processing of a large substrate has been proposed to produce a LCD device sold at a reduced price. In order to overcome the limitation of the view angle range, many solutions have been proposed, such as pixel division, optical film phase complement, and diffusion plate pixel projection.

FIG. 1A is a top view of a TFT array substrate for a conventional IPS liquid crystal display device. FIG. 1B is a schematic cross sectional view taken along line II—II of FIG. 1. It is a characteristic of the IPS liquid crystal display device that the liquid crystal molecules rotate only in the horizontal direction in the same plane. A TFT array substrate mainly consists of a transparent substrate having a plurality of TFTs 102 in array. Each of the TFTs 102 corresponds to a pixel region 104 which has a plurality of metal common electrodes 106 and a plurality of metal pixel electrodes 108. The metal common electrode 106 is located under the metal pixel electrode 108 and an insulating layer 107 is interposed there between. A source/drain region 110 of the TFT 102 is electrically connected to a signal line 114 and a metal pixel electrode 108. A protection layer 116 is further formed over the transparent substrate 100 to cover the TFT 102 and the pixel region 104. By action of a horizontal electric field between the metal pixel electrode 108 and the metal common electrode 106, the liquid crystal molecules rotate in a same plane in a direction parallel to the substrate to display, thereby reducing the dependency on view angle.

With reference to FIG. 2A, since there is a horizontal electric field between the metal pixel electrode 108 and the metal common electrode 106 in the conventional IPS liquid crystal display device, broader range of view angle is provided. However, the liquid crystal molecules above the metal pixel electrode 108 or the metal common electrode 106 can not display due to the horizontal electric field, causing a low aperture issue.

With reference to FIG. 2B, in order to overcome the low-aperture problem of the conventional IPS liquid crystal display, a FFS liquid crystal display device has been proposed. In the FFS liquid crystal display device, a transparent pixel electrode 108b is formed on a transparent common electrode 106b with a distance smaller than a width of an electrode and a cell gap of a display, so that the horizontal electric field is distributed uniformly between and above the electrodes 106b and 108b and the aperture of the IPS liquid crystal display device is thus increased. However, the FFS liquid crystal display device has some drawbacks, for example, electrode gaps defined by different masks are difficult to control. Furthermore, after the underlay transparent common electrode 106b is formed, a mask and a deposition process are required to pattern the transparent pixel electrode 108b. Alignment of the transparent electrodes 108b and 106b is critical to the manufacturing process. If misalignment occurs, then the electric field can not be distributed uniformly and the display quality can be adversely effected. Further, a big liquid crystal display is formed of small liquid crystal display cells. Shot mura issue tends to occur in assembly of liquid crystal cells made by a conventional process, especially an exposure process using a stepper.

SUMMARY OF THE INVENTION

In one aspect of the present invention, a TFT array substrate and a process for manufacturing the same are provided. The TFT array substrate of the present invention has advantageously high aperture and transparent electrodes that disconnect but overlap each other. The transparent electrodes in the TFT array substrate can be self-aligned so that misalignment of electrodes in the prior art can be avoided.

In order to achieve the above and other objects of the present invention, a TFT array substrate and a process for manufacturing the same are provided. A plurality of TFTs in array are formed on a transparent substrate by a conventional process for producing a TFT. During the TFT process, a first metal is used to form a scan line, a gate and a common line. A gate insulating layer and a protection layer are sequentially formed in a pixel region of the transparent substrate. By selecting the material type of an etchant, the gate insulating layer and the protection layer, an etching rate of the gate insulating layer can be controlled to be larger than that of the protection layer, so that a plurality of openings are formed in the gate insulating layer and the protection layer. The opening in the gate insulating layer has an undercut profile. Then, a transparent conductive layer is formed over the substrate. Since the opening has an undercut profile, the transparent conductive layer separates into two parts at the edge of the opening. One of the two parts separated is located in a bottom of the opening and the other is on the protection layer, such that two parts of the transparent conductive layer disconnect and no junction there between occurs. The part of the transparent conductive layer in the bottom of the opening is referred to as a transparent pixel electrode. The part of the transparent conductive layer on the protection layer is connected to a common metal line to form a transparent common electrode.

Another TFT array substrate and a process for manufacturing the same are also provided. A plurality of TFTs are formed in array on the substrate by a conventional process. The gate insulating layer can be a multi-layered structure, such as a two-layered structure having a first insulating layer and a second insulating layer. In the case of the two-layered structure recited above, the first insulation and the second insulating layer overlie a pixel region of the substrate. By selecting the material type of an etchant, the gate insulating layer and the protection layer, an etching rate of the first insulating layer can be controlled to be larger than that of the second insulating layer, so that a plurality of openings are formed in the first insulating layer and the second insulating layer. The opening in the first insulating layer has an undercut profile. Then, a transparent conductive layer is formed over the substrate. Since the opening has an undercut profile, the transparent conductive layer separates into two parts at the edge of the opening. One of the two parts separated is located in a bottom of the opening and the other is on the second insulating layer, such that two parts of the transparent conductive layer disconnect and no junction there between occurs. The part of the transparent conductive layer in the bottom of the opening is referred to as a transparent pixel electrode. The part of the transparent conductive layer on the second insulating layer is connected to a common metal line to form a transparent common electrode.

BRIEF DESCRIPTION OF THE DRAWINGS

It is to be understood that both the foregoing general description and the following detailed description are exemplary, and are intended to provide further explanation of the invention as claimed.

The accompanying drawings are included to provide a further understanding of the invention, and are incorporated in and constitute a part of this specification. The drawings illustrate embodiments of the invention and, together with the description, serve to explain the principle of the invention. In the drawings.

DESCRIPTION OF THE PREFERRED EMBODIMENT

Figure 1A:
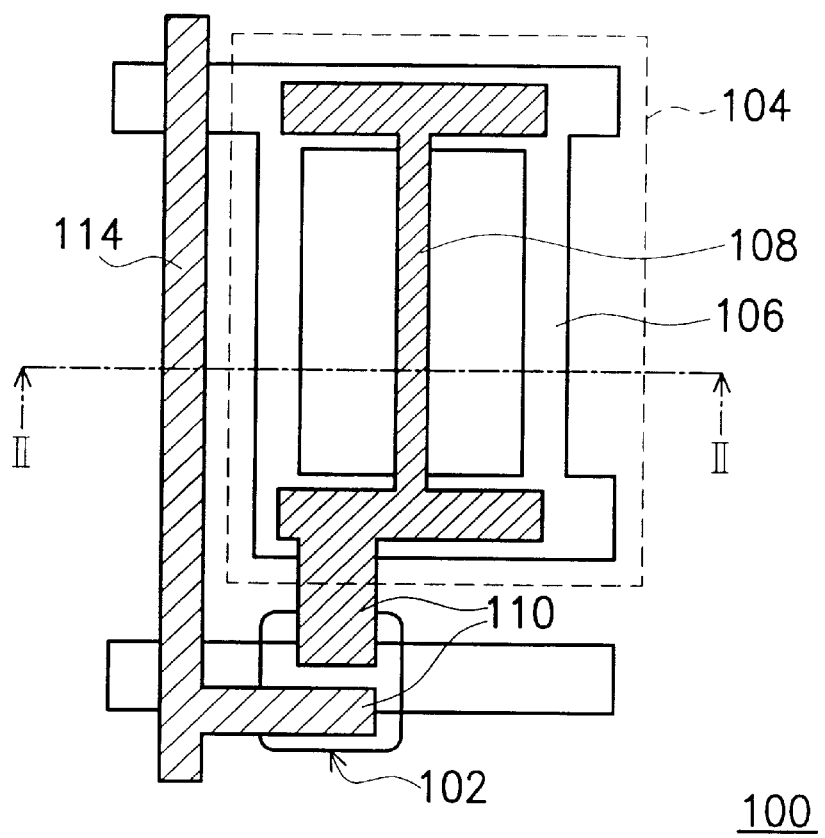
FIG. 1A is a top view of a TFT array substrate for a conventional IPS liquid crystal display device.
Figure 1B:
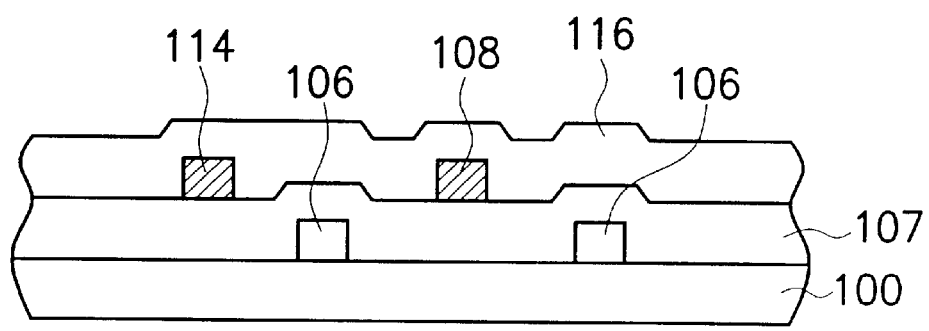
FIG. 1B is a schematic cross sectional view taken along line II—II of FIG. 1.
Figure 2A:
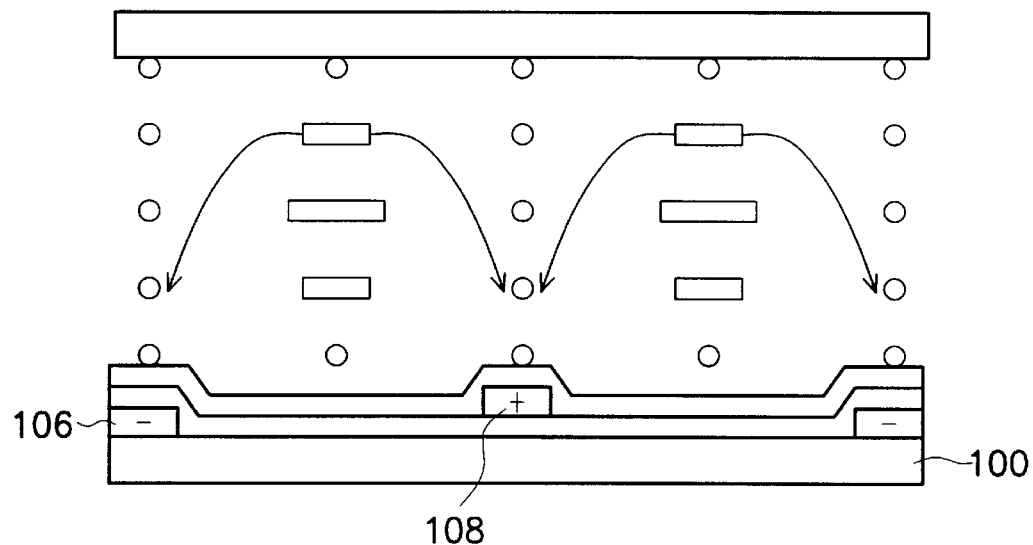
FIG. 2A schematically shows a TFT array substrate for a conventional IPS liquid crystal display device.
Figure 2B:
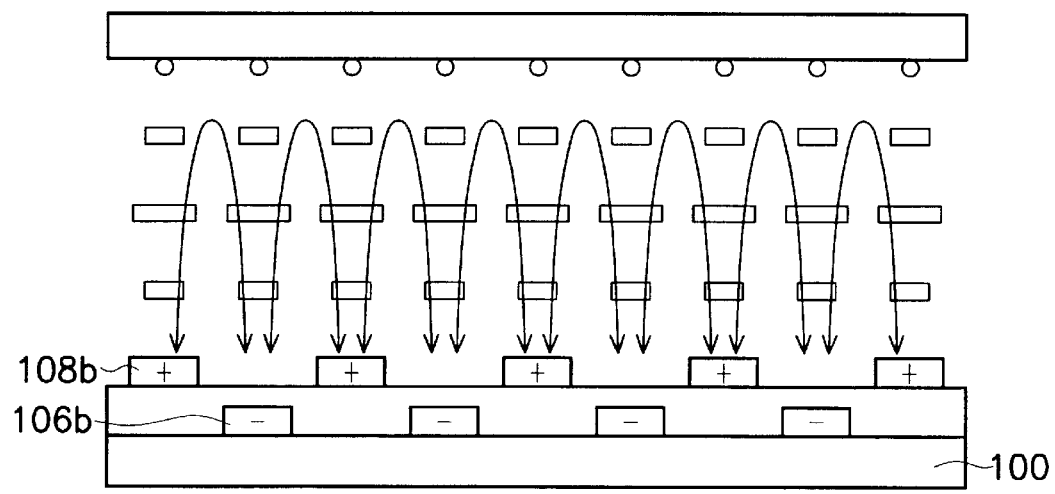
FIG. 2B schematically shows a TFT array substrate for a conventional IPS liquid crystal display device.

Reference will now be made in detail to the present preferred embodiments of the invention, examples of which are illustrated in the accompanying drawings. Whenever possible, the same reference numbers are used in the drawings and the description to refer to the same or like parts.

Figure 3:
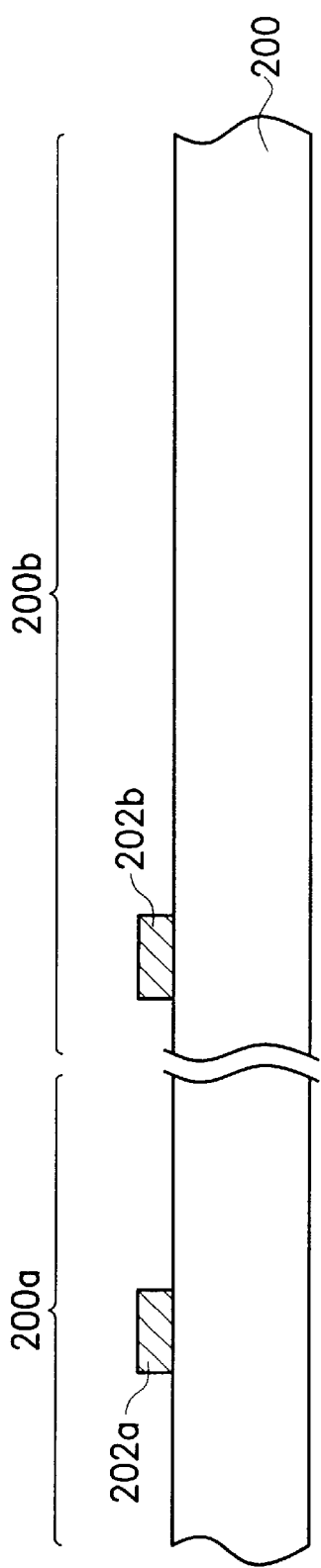
FIGS. 3–6 schematically show a process for manufacturing a TFT array substrate for an IPS liquid crystal display device according to a first preferred embodiment of the present invention.

FIGS. 3–7 are an IPS mode liquid crystal display device and a method of manufacturing the same according to a first preferred embodiment of the present invention. In FIG. 3, a transparent substrate 200 is provided. The transparent substrate can be made of glass, for example. A plurality of thin film transistor (TFT) regions 200a and pixel regions 200b are formed in array in the transparent substrate 200. A conductive layer is formed on the TFT regions 200a and the pixel regions 200b. Then, a photolithography process is performed to form a gate 202a and a common line 202b. The material used for the gate 202a and the common line 202b can be metal such as tantalum, molybdenum, aluminum, and chromium. The common line 202b is used to reduce the total resistance of the common electrode and connect to a transparent common electrode formed later.

Figure 4:
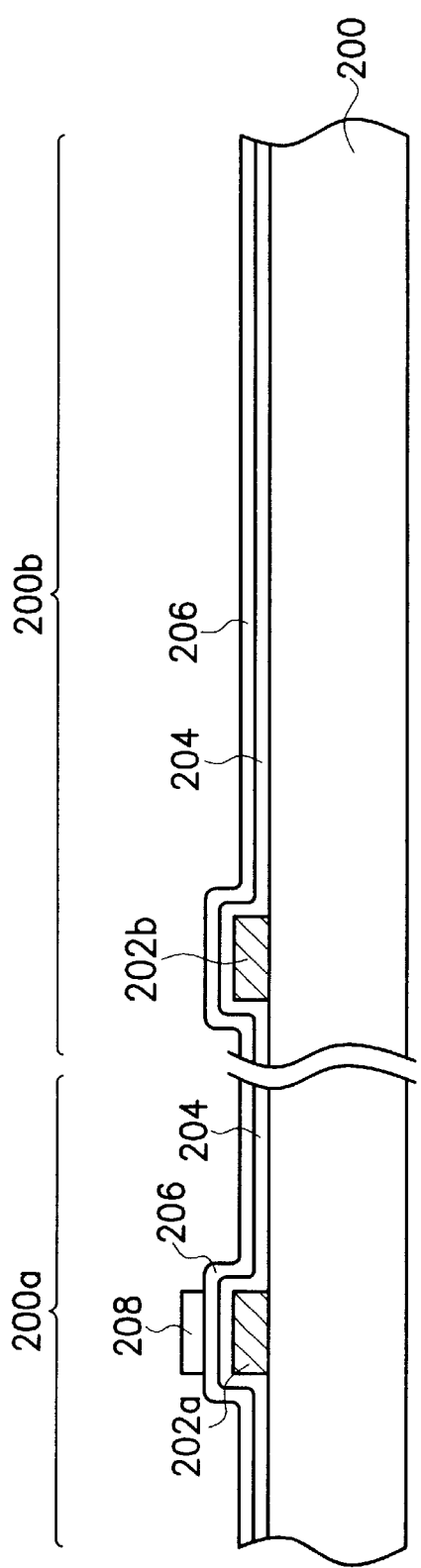

In FIG. 4, after the gate 202a is formed, a gate insulating layer 204, a channel 206 and a silicon nitride layer are sequentially formed on the transparent substrate 200. The gate insulating layer 204 can be made of a CVD silicon oxide (SiOx) or silicon nitride (SiNx), for example. The channel 206 can be made of intrinsic amorphous silicon. Subsequently, the silicon nitride on the channel 206 is partially removed, leaving only the portion of the silicon nitride above the gate 202a to be as an etching stop layer 208. The etching stop layer 208 is used in a sequential etching step for forming a source and drain region.

Figure 5:
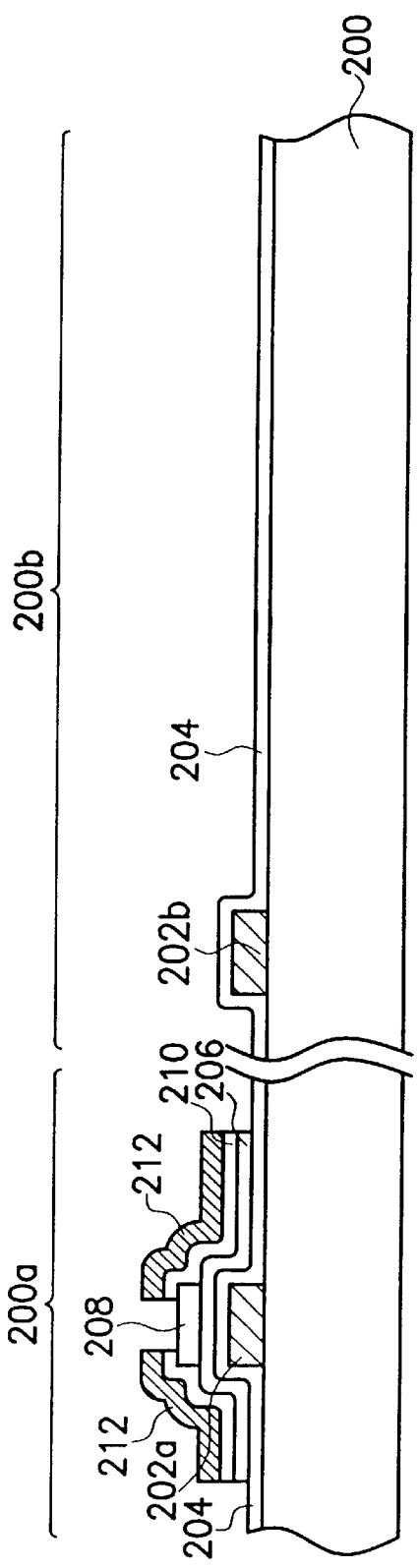

In FIG. 5, after the etching stop layer 208 is formed, a contact layer 210 and a source/drain conductive layer are formed in sequence on the transparent substrate 200. A source/drain region 212 is defined, and then the contact layer 210, the source/drain conductive layer and the channel 206 outside the source/drain region 212 are removed. Removing the contact layer 210, the source/drain conductive layer and the channel 206 outside the source/drain region 212 can be achieved by etching, while the etching stop layer 208 located above the gate 202a can protect the channel there under from being etched and damaged.

Figure 6:
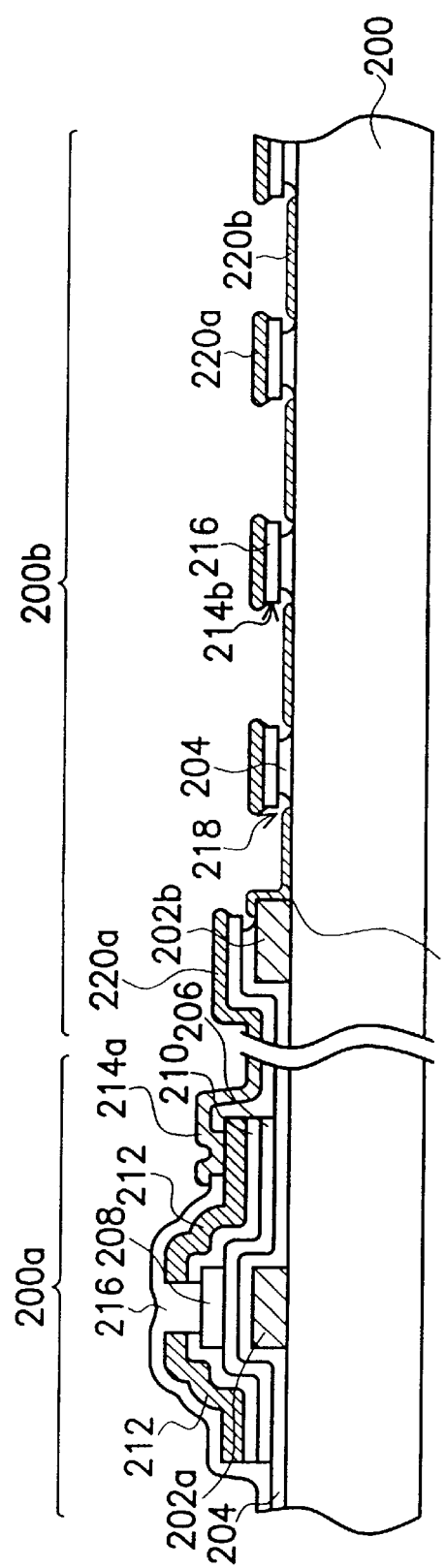

In FIG. 6, after the source/drain region 212 is formed, a protection layer 216 is formed on the TFT region 200a and the pixel region 200b of the transparent substrate 200. The protection layer can be varied according to the material of the gate insulating layer 204 and the type of the etchant, provided that the etching rate of the gate insulating layer 204 is significantly larger than that of the protection layer 216. The selective etching rate of the gate insulating layer 204 with respect to the protection layer 216 is set to be more than 1, preferably in the range of 1 to 10 to form an undercut profile. For example, if the gate insulating layer 204 is made of silicon oxide (SiOx), then the material of the protection layer 216 can be chosen from silicon nitride (SiNx) or a polymer which has an etching rate much smaller than the silicon oxide by using a suitable etchant. If the gate insulating layer 204 is made of silicon nitride, then the material of the protection layer can be selected from a polymer which has an etching rate much smaller than silicon nitride. It should be understood that the materials of the gate insulating layer and the protection layer are not limited to those specifically recited above. Any material can be used for the gate insulation and the protection layer, as long as the etching rate of the gate insulating layer is much larger than that of the protection layer.

In FIG. 6, after the protection layer is formed, a photolithography process is performed to form an opening 214a on the source/drain region 212 in the TFT region 200a, and form a plurality of openings 214b in the pixel region 200b. The openings 214b can be shaped into strips parallel to each other. Subsequently, an etching process is carried out to partially remove the protection layer 216 and the gate insulating layer 204 to form openings 214a and 214b. Since the protection layer 216 has an etching rate much smaller than the silicon oxide 204, an undercut profile 218 is formed at the edge of the gate insulating layer 204 after etching. The etching of the opening ends at the source/drain region 212. Finally a transparent conductive layer is formed over the pixel region 200b. Since the undercut profile 218 is formed at the edge of the gate insulating layer 204, the resultant conductive layer separates into a transparent common electrode 220b and a transparent pixel electrode 220a. The transparent common electrode 220b and the transparent pixel electrode 220a are located in a bottom of the opening 214b and on a top surface of the protection layer 216, respectively. The transparent common electrode 220b and the transparent pixel electrode 220a can be made of indium tin oxide (ITO) or indium zinc oxide, for example. The transparent pixel region 220b in each of the pixel regions 200b is electrically connected to the source/drain region 212 in TFT region 200a through the opening 214a. The transparent common electrode 220b is electrically connected to the metal common electrode 202b through the opening 214b. The contact resistance can be thus reduced. Further, in order to make the topography of the pixel region 200b smooth, a transparent polymer film is optionally applied over the transparent conductive layer after the transparent conductive layer 230 is formed, and defined together with the transparent conductive layer 230, as shown in FIG. 7.

Figure 7:
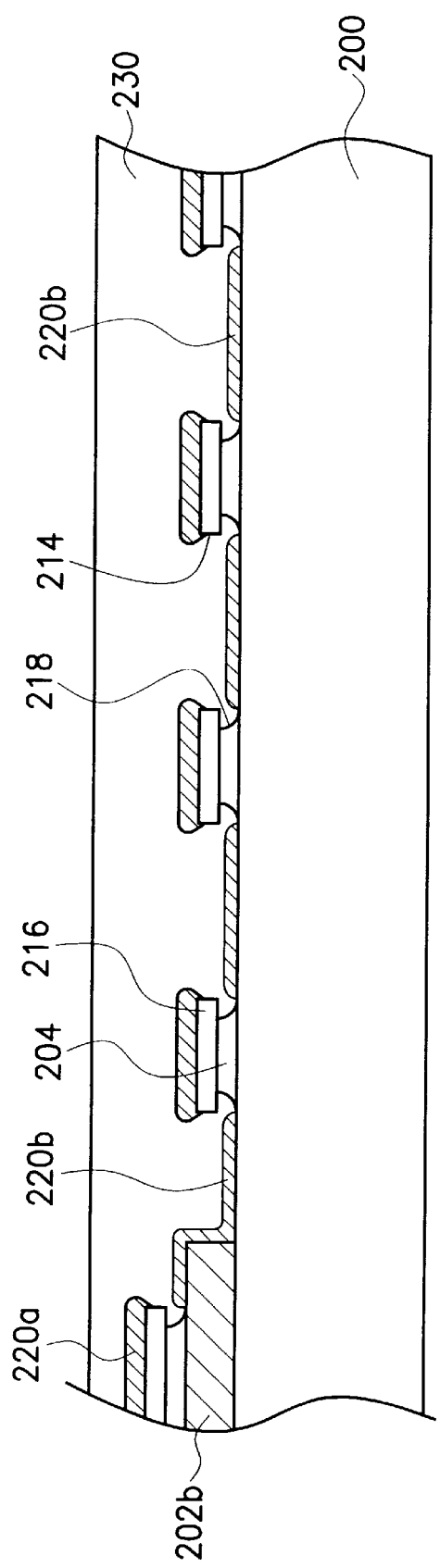
FIG. 7 is a local enlarged view of a pixel region in the IPS liquid crystal display device according the first preferred embodiment of the present invention.

FIG. 7 is a locally enlarged view of a pixel region in an IPS mode liquid crystal display device according to the first preferred embodiment of the present invention. In FIG. 7, the undercut profile 218 is formed at the edge of the gate insulating layer 204. The undercut profile 218 separates the transparent pixel electrode 220a and the transparent common electrode 220b from the edge of the opening 214b to prevent any junction between the transparent pixel electrode 220a and the transparent common electrode 220b. The transparent pixel electrode 220a and the transparent common electrode 220b formed according to the present invention can be self-aligned, eliminating the prior problem with respect to misalignment of the pixel electrode and common electrode. Moreover, the transparent pixel electrode 220a and the transparent common electrode 220b disconnect but overlap each other. Therefore, strength and distribution of the horizontal electric field between the transparent pixel electrode 220a and the transparent common electrode 220b help increase the aperture in display quality and lower the work voltage. In addition, the transparent pixel electrode 220a and the transparent common electrode 220b are formed simultaneously by deposition, resulting in a simplified manufacture process.

Figure 8:
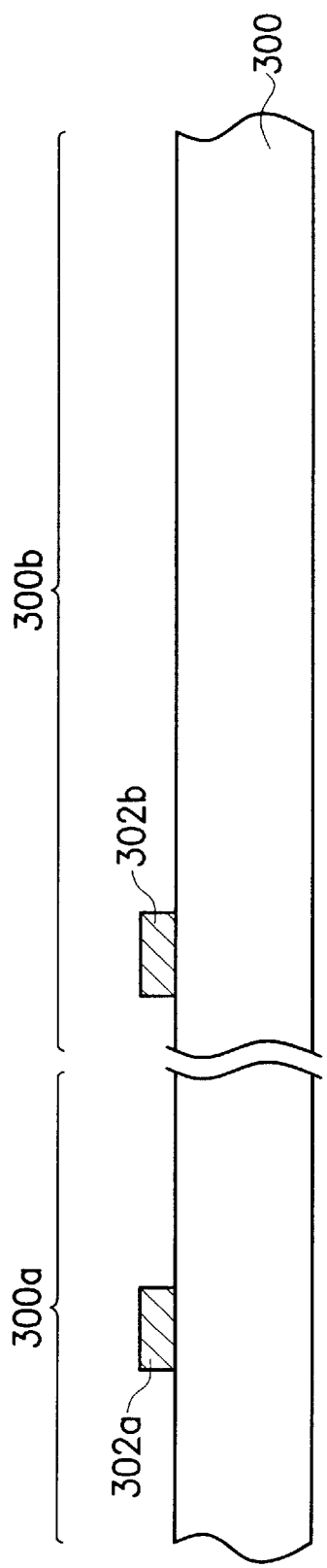
FIGS. 8–11 show a process for manufacturing a TFT array substrate for an IPS liquid crystal display device according to a second preferred embodiment of the present invention.
Figure 9:
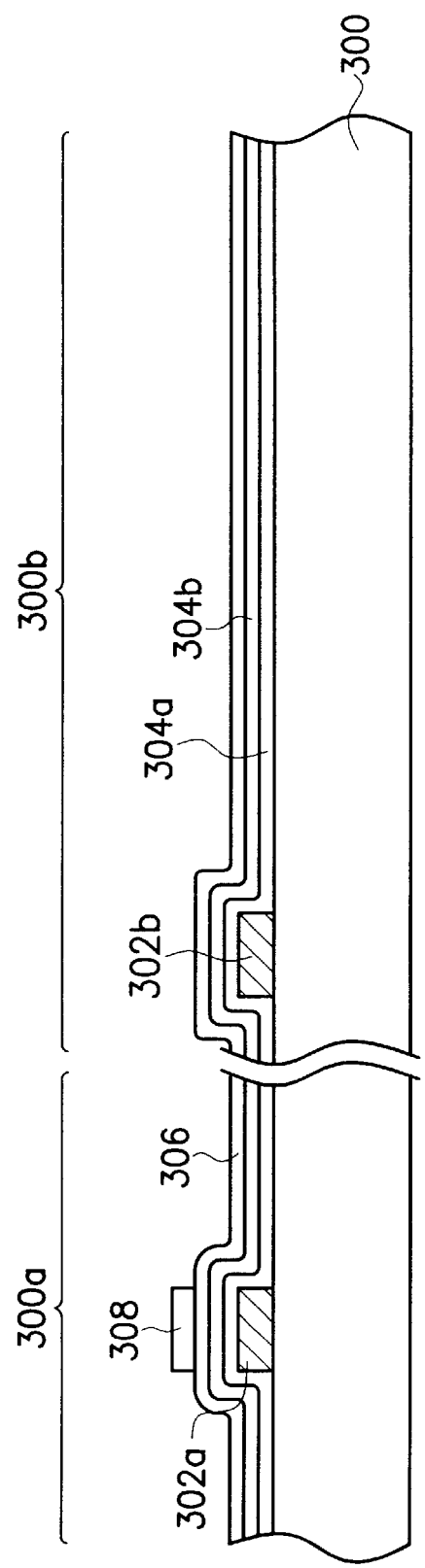

FIGS. 8–11 show a TFT array substrate for an IPS mode liquid crystal display device according to a second preferred embodiment of the present invention. In FIG. 8, a transparent substrate 300 is provided. The transparent substrate 300 can be made of glass, for example. A plurality of thin film transistor (TFT) regions 300a and pixel regions 300b are formed in array in the transparent substrate 300. A conductive layer is formed in the TFT regions 300a and the pixel regions 300b. Then, a photolithography process is performed to form a gate 302a and a common line 302b. The material used for the gate 302a and the common line 302b can be metal such as tantalum, molybdenum, aluminum, and chromium. In FIG. 9, after the gate 302a is formed, a first gate insulating layer 304a, a second gate insulating layer 304b, a channel 306 and a silicon nitride layer are sequentially formed on the transparent substrate 300. The first gate insulating layer 304a can be made of a CVD silicon oxide (SiOx) or silicon nitride (SiNx), for example. The second gate insulating layer 304b is selected dependent on the material of the first gate insulating layer 304a and the etchant, provided that the first gate insulating layer 304a has an etching rate larger than the second gate insulating layer 304b. For example, if the first gate insulating layer 304a is made of silicon oxide (SiOx), then the material of the second gate insulating layer 304b can be made of silicon nitride (SiNx), which has an etching rate smaller than the silicon oxide, by using a suitable etchant. The selective etching rate of the first gate insulating layer 304a with respect to the second gate insulating layer 304b is set to be more than 1, preferably in the range of 1 to 10. The channel 306 can be made of intrinsic amorphous silicon. Subsequently, the silicon nitride layer on the channel 306 is partially removed, leaving only the portion of the silicon nitride layer above the gate 302a to be as an etching stop layer 308. The etching stop layer 308 is used in a sequential etching step for forming a source and drain region.

Figure 10:
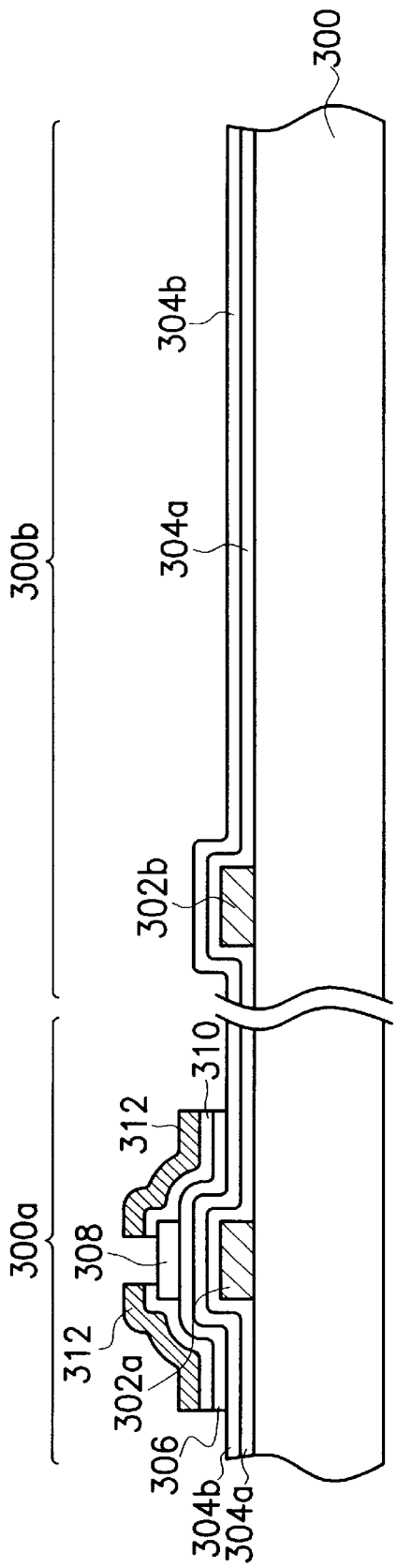

In FIG. 10, after the etching stop layer 308 is formed, a contact layer 310 and a source/drain conductive layer are formed in sequence on the transparent substrate 300. A source/drain region 312 is defined, and then the contact layer 310, the source/drain conductive layer and the channel 306 outside the source/drain region 312 are removed. Removing the contact layer 310, the source/drain conductive layer and the channel 306 outside the source/drain region 312 can be achieved by etching. While, the etching stop layer 308 located above the gate 302a can protect the channel there under from being etched and damaged.

Figure 11:
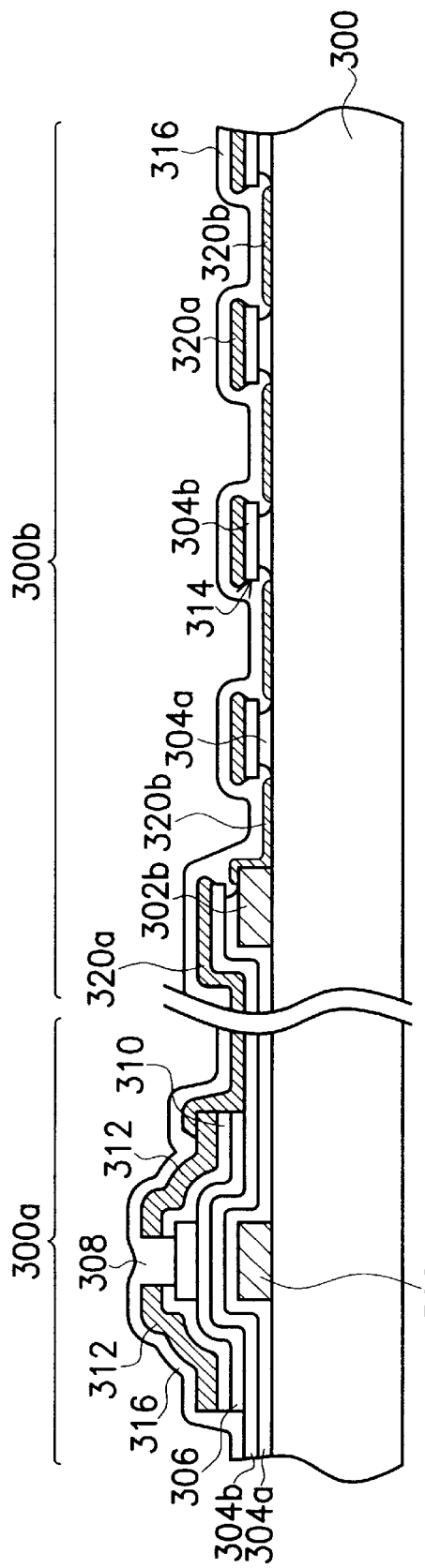

In FIG. 11, after the source/drain region 312 is formed, a photolithography process is performed to form a plurality of openings 314 in the pixel region 300b. The openings 314 can be shaped into strips parallel to each other. Subsequently, an etching process is carried out to partially remove the first gate insulating layer 304a and the second gate insulating layer 304b to form openings 314. Since the first gate insulating layer 304a is etched faster in the edge area than in other areas, the opening thus formed has an undercut profile 318.

Since the opening 314 has the undercut profile 318 at the edge of the first gate insulating layer 304a, the resultant conductive layer separates into a transparent common electrode 320b and a transparent pixel electrode 320a, which are located in a bottom of the opening 314 and on a top surface of the protection layer 316 later formed, respectively. The transparent common electrode 320b and the transparent pixel electrode 320a can be made of indium tin oxide (ITO) or indium zinc oxide, for example. The transparent pixel region 320a in each of the pixel regions 300b is electrically connected to the source/drain region 312 in TFT region 300a. The transparent common electrode 320b is electrically connected to the metal common line 302b through the opening 314. The contact resistance can be thus reduced. Finally, a protection layer 316 is formed over the TFT region 300a and the pixel region 300b of the transparent substrate 300. The protection layer 316 can be made of silicon nitride (SiNx), silicon oxide (SiOx) or polymers.

Figure 12:
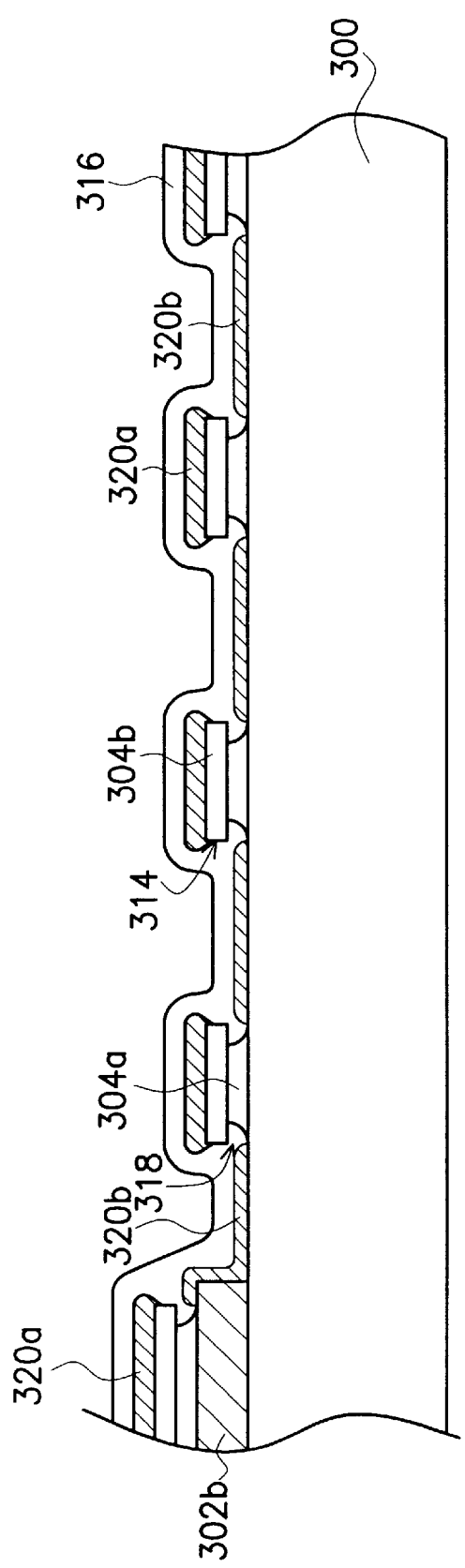
FIG. 12 is a local enlarged view of a pixel region in the IPS liquid crystal display device according the second preferred embodiment of the present invention.

FIG. 12 is a locally enlarged view of a pixel region in an IPS mode liquid crystal display device according to the second preferred embodiment of the present invention. In FIG. 12, the undercut profile 318 formed at the edge of the gate insulating layer 304a separates the transparent pixel electrode 320a from the transparent common electrode 320b at the edge of the opening 314 to prevent any junction between the transparent pixel electrode 320a and the transparent common electrode 320b. The transparent pixel electrode 320a and the transparent common electrode 320b formed according to the present invention can be self-aligned, eliminating the prior problem with respect to misalignment of the pixel electrode and common electrode. Moreover, the transparent pixel electrode 320a and the transparent common electrode 320b disconnect but overlap each other from a top view of the pixel regions. Therefore, strength and distribution of the horizontal electric field between the transparent pixel electrode 320a and the transparent common electrode 320b help increase the aperture in display quality and lower the work voltage. In addition, the transparent pixel electrode 320a and the transparent common electrode 320b are formed at one time by deposition, resulting in a simplified manufacture process.

In view of foregoing, the etching of the gate insulating layers 304a and 304b depends on the processing of other devices. The sequence order of etching the gate insulating layer is not limited to the above specifically recited. Further, the number of the gate insulating layer can be more than two. One of the characteristics of the present invention is that at least two of the electrodes are located in different levels. By selecting the etching rate, the opening thus formed has a tapered shape where the bottom is wider than the top, such that the electrodes formed later can disconnect but overlap each other.

Figure 13:
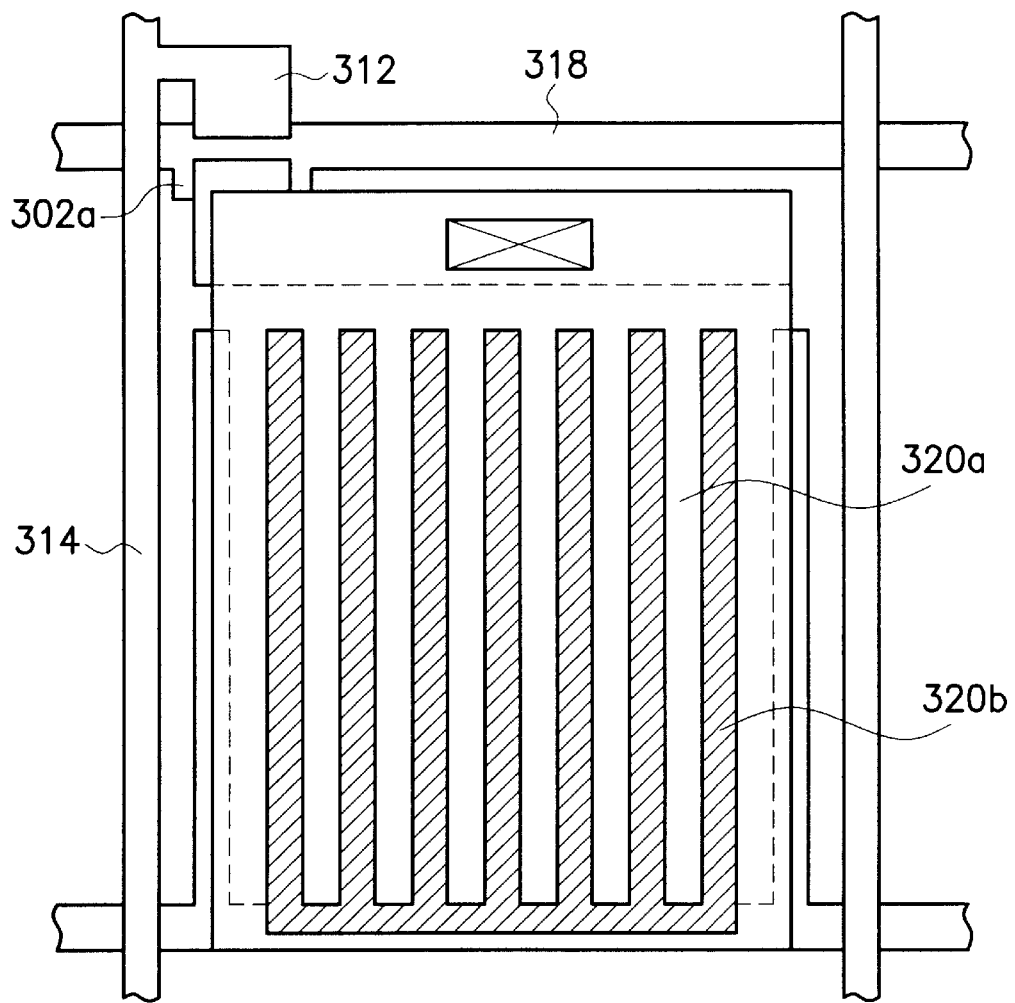
FIG. 13 is a top view of pixels in the IPS liquid crystal display device according to the first and second preferred embodiment of the present invention.

FIG. 13 is a top view of each pixel in the IPS mode liquid crystal display according to the first and second preferred embodiments of the present invention. In FIG. 13, each pixel consists of a TFT region and a pixel region. The TFT region is provided with a thin film transistor (TFT). The pixel region is provided with a plurality of pixel electrodes 320a and common electrodes 320b. A scan line 318 extends from the gate in the TFT region. A signal line 314 extends from the source/drain 312. The pixel electrode 320a overlaps the common electrode 320b in the pixel region.

The present invention provides the following advantages over the prior art:

1. The transparent pixel electrode disconnects but overlaps the common electrode. Compared to the prior IPS display device and the prior FFS display, the TFT array substrate of the present invention has higher aperture and thus provides improved display quality.

2. In the TFT array substrate of the present invention, the transparent pixel electrode can be self-aligned with the transparent common electrode. The problem with respect to misalignment of the mask can be eliminated.

3. In the TFT array substrate of the present invention, by using insulating layers having different etching rates, the transparent common electrode and the transparent pixel electrode can be formed simultaneously, resulting in a simplified manufacture process.

4. The process for manufacturing the TFT array substrate of the present invention can be compatible with the current TFT manufacture process, as long as a part of the mask is adjusted.

It will be apparent to those skilled in the art that various modifications and variations can be made to the structure of the present invention without departing from the scope or spirit of the invention. In view of the forgoing, it is intended that the present invention cover modifications and variations of this invention provided they fall within the scope of the following claims and their equivalents.

What is claimed is:

1. An in-plane switching (IPS) Liquid Crystal Display array, comprising:

a substrate;

a plurality of pixels arranged in array on the substrate, wherein each of the pixels includes a switching device region and a pixel region, each pixel region includes:

a first insulating layer formed over the substrate, wherein the first insulating layer has a plurality of first openings;

a second insulating layer formed on the first insulating layer, wherein the second insulating layer has a plurality of second openings corresponding to the first openings;

a plurality of first electrodes arranged above the substrate; and a plurality of second electrodes arranged on a top of the second insulating layer.

2. The substrate of claim 1, wherein the first opening has an undercut profile.

3. The substrate of claim 2, wherein the undercut allows the first opening to be wider than the second opening.

4. The substrate of claim 1, wherein the material used to form the first insulating layer includes silicon oxide and silicon nitride.

5. The substrate of claim 1, wherein the material used to form the second insulating layer includes silicon nitride.

6. The substrate of claim 1, wherein the material used to form the substrate includes indium tin oxide and indium zinc oxide.

7. The substrate of claim 1, wherein the first electrode disconnects but overlaps the second electrode.

8. An array of active matrix LCD, comprising at least:

a substrate having a plurality of pixels, wherein each of the pixels has a pixel region and a switching device region;

an insulating layer covering at least a part of the pixel region, wherein the insulating layer has at least an opening to expose the substrate, and wherein the opening has a bottom wider than a top;

a first electrode deposited on the opening of the insulating layer;

a second electrode formed on a top of the insulating layer adjacent to the opening, wherein there is no space between the first electrode and the second electrode from a top view of the pixel region.

9. The array of claim 8, wherein the first electrode is a pixel electrode.

10. The array of claim 8, wherein the second electrode is a common electrode.

11. The array of claim 8, wherein the switching device region has a plurality of TFTs.

12. An array of active matrix liquid crystal display, comprising at least:

a substrate;

a plurality of parallel scan lines and a plurality of parallel signal lines arranged on the substrate to form a plurality of pixel regions, wherein each of the pixel regions comprises:

a switching means at a crossing point of the scan lines and the signal lines in each of the pixel regions;

a plurality of common electrodes formed in each of the pixel regions;

a plurality of pixel electrodes connected to the switching means in each of the pixel regions, wherein the common electrodes and the pixel electrodes are parallel to one another between different layers and there is no space between the common electrode and the pixel electrode from a top view of the pixel regions.

13. The array of claim 12, wherein the switching means is a thin film transistor.

* * * * *